Dec. 21, 1943.    J. F. PETERS    2,337,063
MACHINE FOR MAKING CONTAINER PARTS
Filed Aug. 8, 1941    8 Sheets-Sheet 1

INVENTOR
John F. Peters
BY
ATTORNEYS

Dec. 21, 1943.  J. F. PETERS  2,337,063
MACHINE FOR MAKING CONTAINER PARTS
Filed Aug. 8, 1941   8 Sheets-Sheet 3

Fig. 9

INVENTOR
John F. Peters
BY Ivan D. Thornburgh
Chas. H. Erne
ATTORNEYS

Dec. 21, 1943.   J. F. PETERS   2,337,063
MACHINE FOR MAKING CONTAINER PARTS
Filed Aug. 8, 1941   8 Sheets-Sheet 4

INVENTOR
*John F. Peters*
BY
*Ivan D. Thornburgh*
*Chas. H. Erne*
ATTORNEYS

Dec. 21, 1943.   J. F. PETERS   2,337,063
MACHINE FOR MAKING CONTAINER PARTS
Filed Aug. 8, 1941   8 Sheets-Sheet 7

Dec. 21, 1943.   J. F. PETERS   2,337,063
MACHINE FOR MAKING CONTAINER PARTS
Filed Aug. 8, 1941   8 Sheets-Sheet 8

INVENTOR
John F. Peters
BY Ivan O. Thornburgh
Chas. H. Ewing
ATTORNEYS

Patented Dec. 21, 1943

2,337,063

UNITED STATES PATENT OFFICE 2,337,063

MACHINE FOR MAKING CONTAINER PARTS

John F. Peters, Leonia, N. J., assignor to American Can Company, New York, N. Y., a corporation of New Jersey Application August 8, 1941, Serial No. 406,045

10 Claims. (Cl. 93—36)

The present invention relates to a machine for making fibre container parts and has particular reference to forming and assembling such parts to produce a container end closure unit.

In the manufacture of fibre containers of the character disclosed in United States Patent 2,085,979, issued July 6, 1937 to John M. Hothersall, on Container, the top end member of the container is provided with a closure element which is preferably secured in place with a staple so that the closure element may be opened and closed by bending it adjacent the staple in hinge fashion.

The present invention contemplates the forming of such a closure element from a pre-cut blank, assembling it with a preformed container end member, and securing it in place with a wire staple to produce a complete end closure unit ready for assembling with a container.

An object, therefore, of the invention is the provision of a fibre container end member forming and assembling machine wherein a fibre closure element is formed from a pre-cut blank, is assembled in proper position on a preformed end member and is secured in place by a wire staple to produce a complete end closure unit ready for assembling with a container.

Numerous other objects and advantages of the invention will be apparent as it is better understood from the following description, which, taken in connection with the accompanying drawings, discloses a preferred embodiment thereof.

Referring to the drawings.

Figures 1, 2, 3, 4, 5, 6, 7:
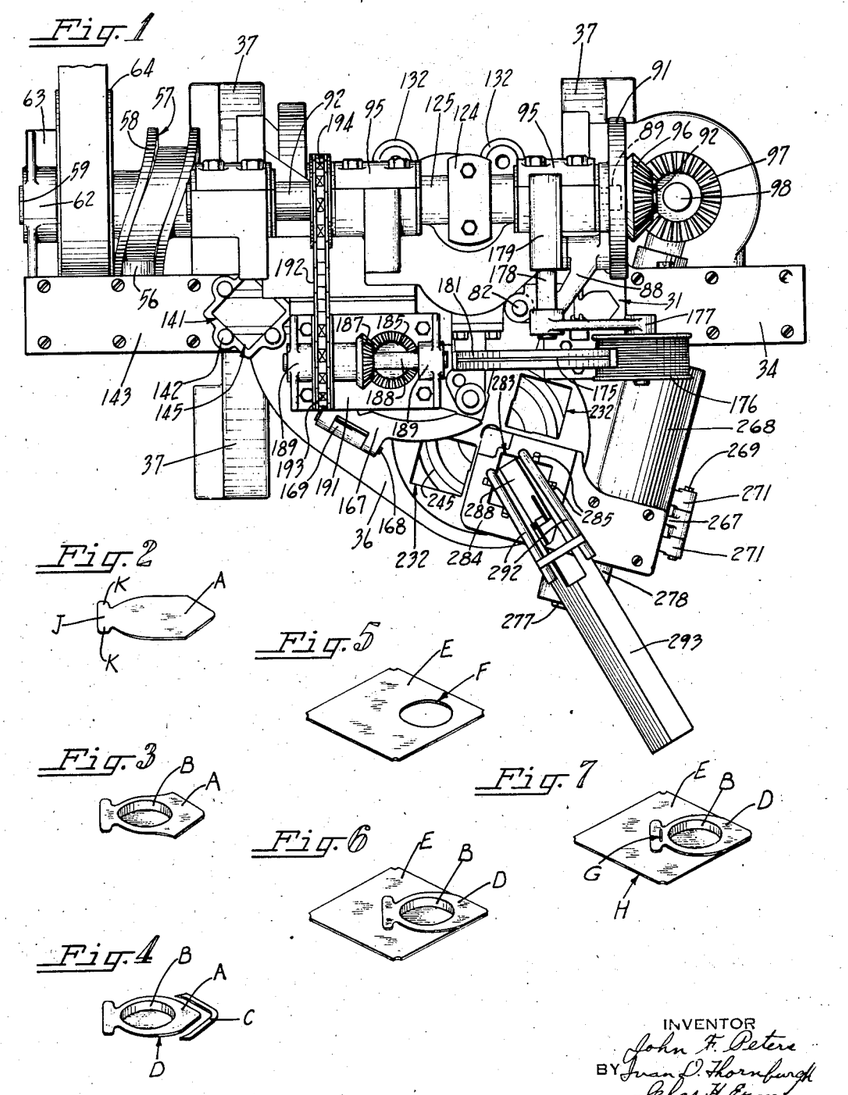
Figure 1 is a top plan view of a machine embodying the instant invention.
Figs. 2, 3 and 4 are enlarged perspective views of a closure element which is fed into and is formed and trimmed in the machine shown in Fig. 1, the views showing different stages incident to the production of the final closure element.
Figs. 5, 6 and 7 are enlarged perspective views of a preformed end member which is fed into the machine to receive a closure element, the views showing the various steps incident to the application of the closure element and to its attachment by means of a staple.

As a preferred embodiment of the instant invention the drawings illustrate a machine in which a pre-cut blank A (Fig. 2) of fibre sheet material is formed with a depressed plug B (Fig. 3) and is trimmed of a scrap portion C (Fig. 4) to produce a closure element D for a container. Such a closure element is secured to a fibre end member E (Fig. 5) having a dispensing opening F in one corner thereof. The closure element is placed first in a predetermined position as shown in Fig. 6 with its depressed plug B inserted into the dispensing opening F. While in this position a wire staple G (Fig. 7) is driven through the assembled parts to secure them together and to provide a hinge element for the closure. This completes the assembling of the closure element with the end member and results in the composite end closure unit H hereinbefore mentioned.

Figure 8:
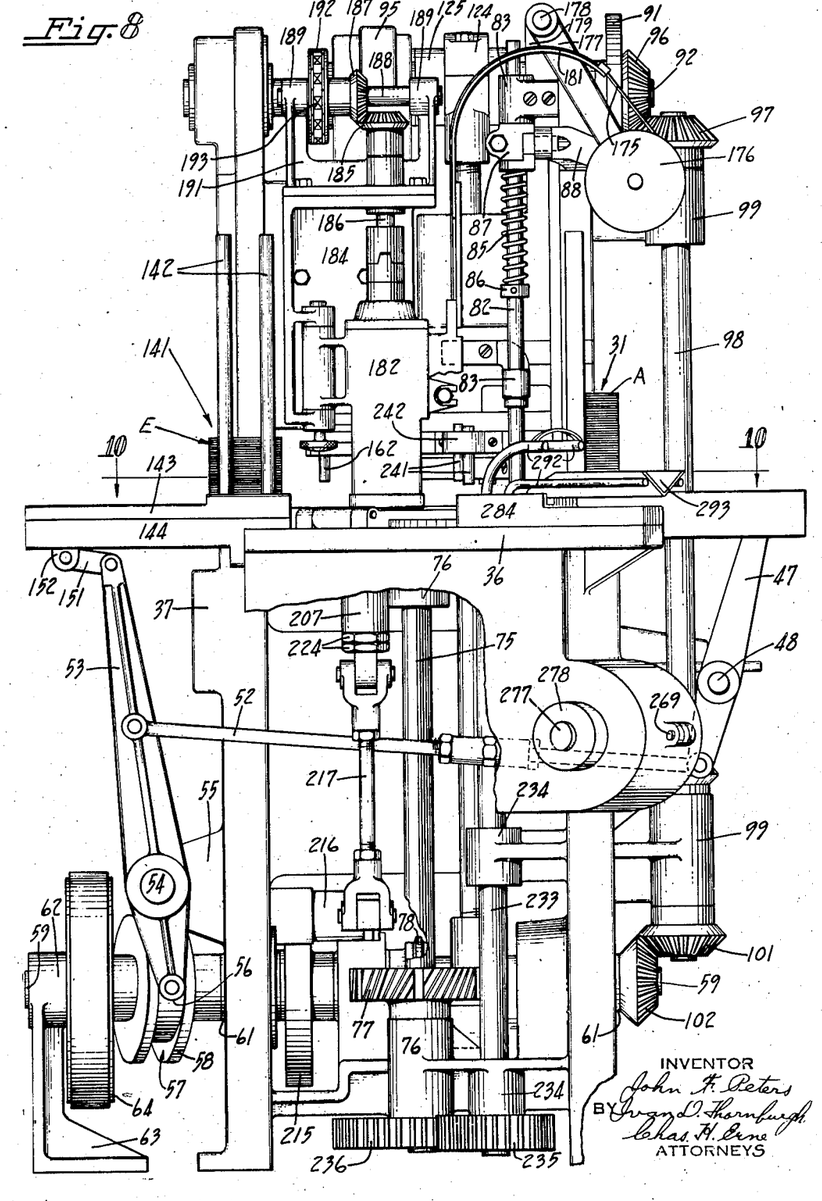
Fig. 8 is a front view of the machine shown in Fig. 1, with parts broken away.
Figures 10, 11, 12, 13:
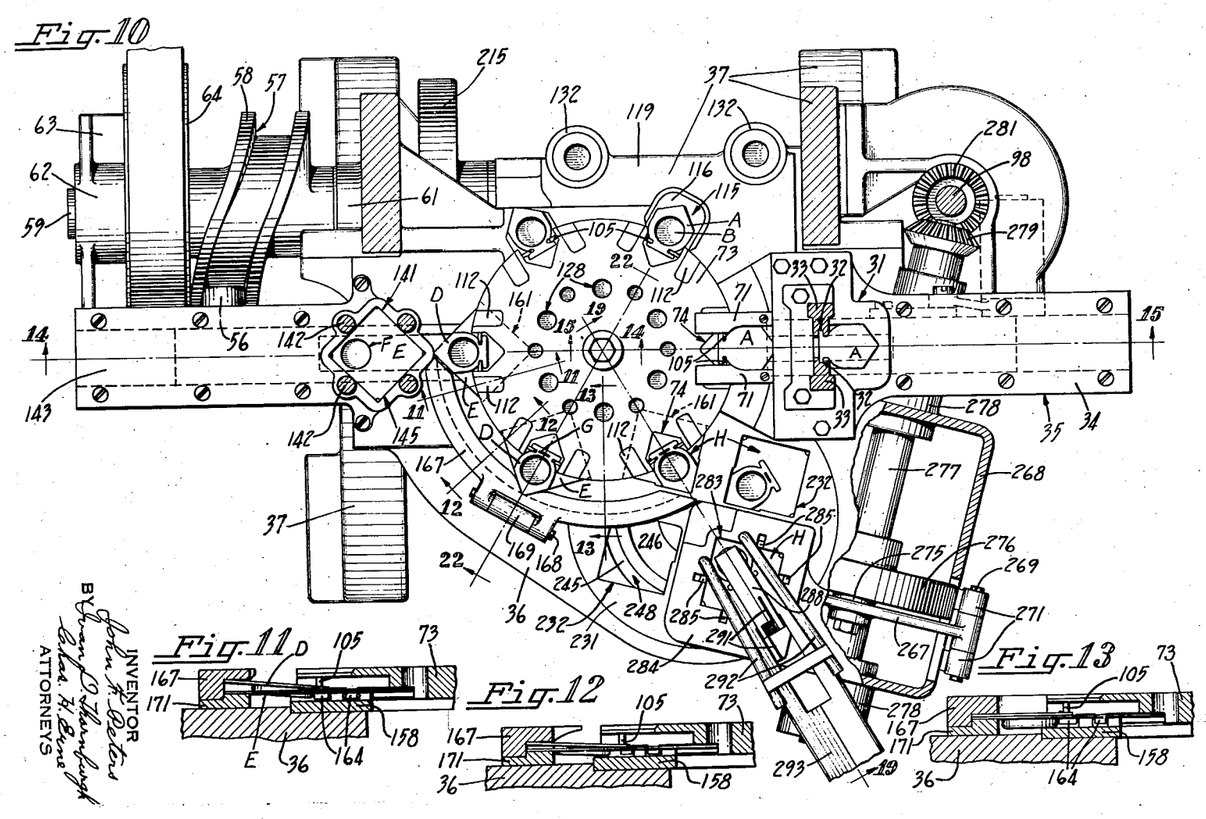
Fig. 10 is a horizontal section taken substantially along the line 10—10 in Fig. 8, with parts broken away.
Figs. 11, 12 and 13 are sectional details taken substantially along the respective lines 11—11, 12—12, 13—13 in Fig. 10, and showing how a closure element is assembled with an end member.

In the machine, the closure element blanks A are fed individually from the bottom of a stack of such blanks retained in a magazine 31 (Figs. 8 and 10). The blanks are formed with a stapling tab J (Fig. 2) having projecting ears K and these tab parts are utilized in retaining the blanks in the magazine. The blank ears K fit into vertical grooves 32 in retaining bars 33 and thus maintain the blanks in a vertical stack. These retaining bars are secured to a cover plate 34 of a slide bracket 35 bolted to a table 36 formed on a frame 37 which constitutes the main frame of the machine.

The lowermost blank A in the magazine 31 extends down through an opening 39 (Fig. 15) in the cover plate 34 and rests on a pair of ledges 41 (see also Fig. 17) in the plate and also rests on top of a reciprocating feed bar 42 disposed in a slideway 43 in the slide bracket. A notch 44 in the top of the feed bar separates the lowermost blank from the stack and feeds it forward as the bar moves through a forward or feeding stroke and then returns through a reverse stroke.

Figure 9:
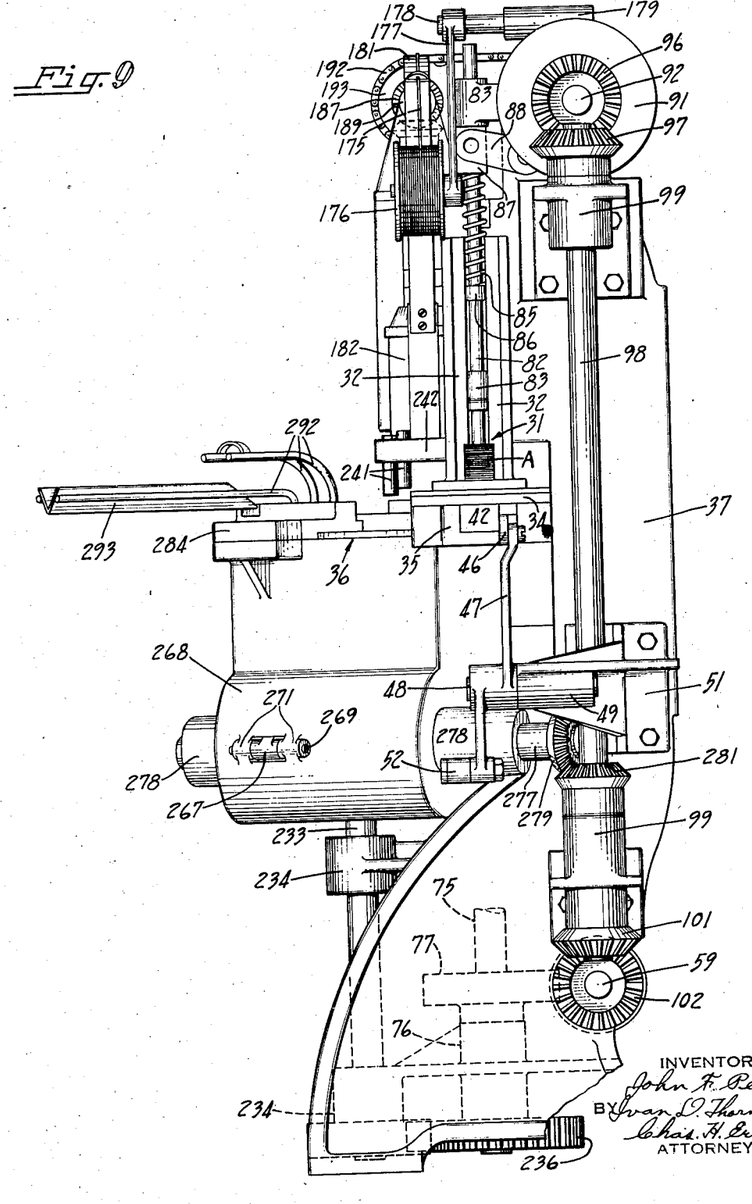
Fig. 9 is a side elevation as viewed from the right in Fig. 8, with parts broken away.

Actuation of the feed bar 42 is brought about by cam action. For this purpose the bar is connected by a link 46 (Figs. 9, 15 and 17) to the upper end of a lever 47 (see also Fig. 8) mounted on a short pivot shaft 48 carried in a bearing 49 formed on a bracket 51 secured to a side of the main frame 37. The lower end of the lever is connected by a link 52 to a cam lever 53 mounted on a short pivot shaft 54 carried in a bearing 55 formed on a side of the main frame 37.

The lower end of the cam lever 53 carries a cam roller 56 (see also Figs. 1 and 10) which operates in a groove 57 of a barrel cam 58 mounted on a drive shaft 59 journaled in bearings 61 formed in the main frame 37 and in a bearing 62 in a bracket stand 63. The shaft constitutes the main drive of the entire machine and is rotated in any suitable manner, such as for example, through a belt pulley 64 mounted on the shaft adjacent the bracket stand 63.

On a forward stroke of the feed bar 42 the blank A fed by the bar is advanced along a pair of short spaced and parallel tracks 71 (Figs. 10 and 15) which extend inwardly from the slide bracket 35. The inner ends of the tracks overhang the outer edge of a horizontal intermittently rotated turret 73 having radial pockets 74 (see also Fig. 23). The turret is mounted on the upper end of a vertical shaft 75 journaled in bearings 76 formed in the machine frame. The turret is advanced in its intermittent rotation by a helical Geneva gear 77 which is mounted on the shaft and which meshes with a helical driving gear 78 mounted on the main driving shaft 59.

Hence each time the Geneva gear 77 and its shaft 75 are partially rotated, the turret 73 is also turned through a partial rotation. When the turret comes to rest after such a partial rotation, one of its pockets 74 is directly under a blank A which has been placed on the tracks 71 by the feed bar 42.

While the turret is in this position, the blank A is pushed down from the tracks 71 into the aligned turret pocket. This transfer of the blank is effected by a vertical push rod 82 (Figs. 8, 9, 15 and 18). The rod is carried in bearings 83 formed in the main frame. The lower end of the rod is formed with an enlarged pad 84. Adjacent its upper end the rod carries a surrounding compression spring 85 which is interposed between a fixed collar 86 on the rod and a loose collar 87 which slides on the rod. The loose collar is pivotally connected to a cam lever 88 (see also Fig. 1) mounted on a pivot pin carried in a boss on the main frame. The lever carries a cam roller 89 which operates in a groove of a face cam 91 mounted on an auxiliary drive shaft 92 located at the top of the machine.

The auxiliary drive shaft 92 is journaled in bearings 95 formed in the machine main frame 37. The shaft is rotated by way of a bevel gear 96 which is mounted on the outer end of the shaft and which meshes with a bevel gear 97 mounted on the upper end of a connecting shaft 98. The connecting shaft is journaled in a pair of spaced bearing brackets 99 bolted to a side of the main frame 37. The lower end of the connecting shaft carries a bevel gear 101 which meshes with a bevel gear 102 carried on the outer end of the main drive shaft 59.

Figures 14, 15, 16, 17, 18:
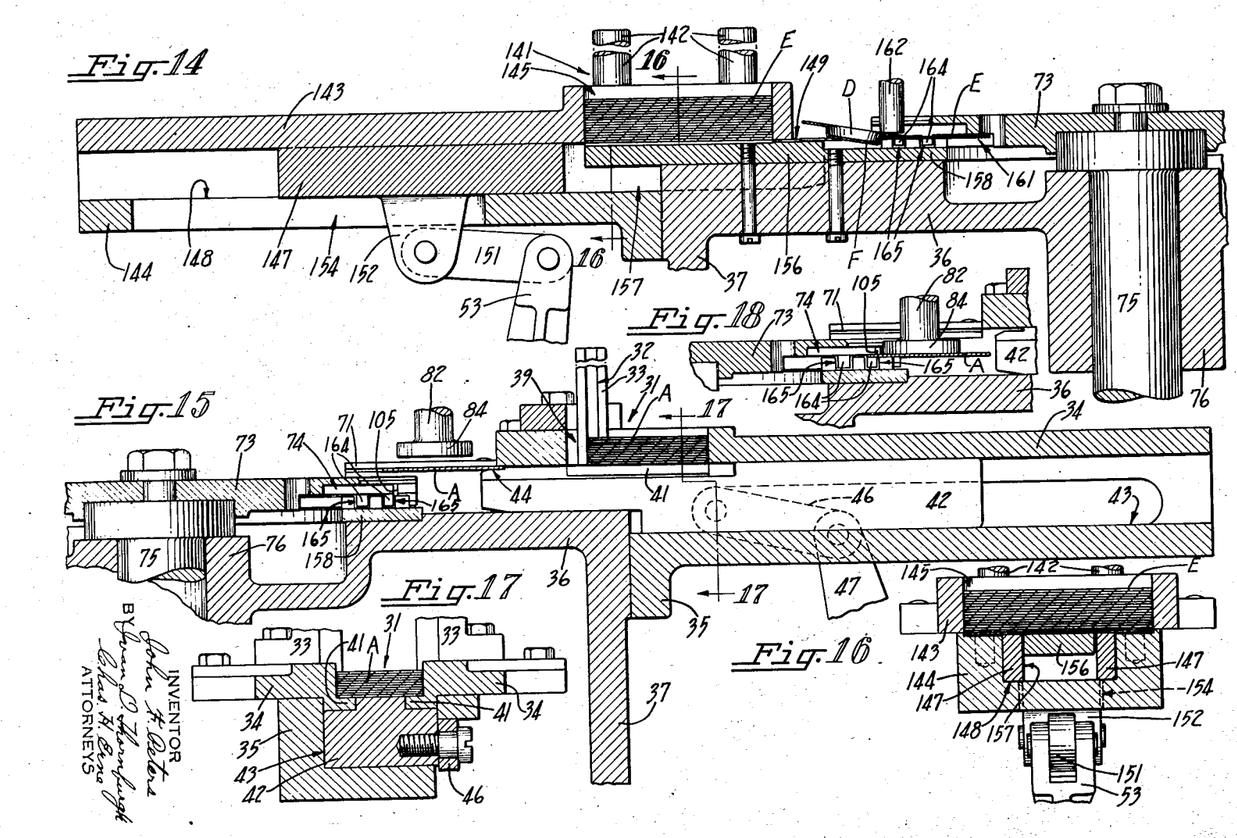
Figs. 14 and 15 are enlarged sectional views taken substantially along the lines 14—14, 15—15 in Fig. 10, with parts broken away.
Figs. 16 and 17 are transverse sectional details taken substantially along the broken lines 16—16, 17—17 in the respective Figs. 14 and 15, with parts broken away.
Fig. 18 is a view similar to that shown at the left in Fig. 15 with the movable parts in a different position and with parts broken away.

Hence the connecting shaft 98 and the auxiliary driving shaft 92 are rotated in time with the main drive shaft 59. This also rotates the cam 91 in time with the rotation of the turret 73 and thus rocks the cam lever 88 downwardly against the spring 85. This forces the push rod 82 and pad 84 down against the blank A on the tracks 71. This movement of the push rod transfers the blank from the tracks 71, as shown in Fig. 15, to the pocket 74 of the turret 73, as shown in Fig. 18.

A blank A transferred into a pocket 74 of the turret 73 is received in the grip of a pair of oppositely disposed fingers 105 (Fig. 24) which extend into the pockets. These fingers are formed on pivot members 106 disposed in vertical seats 107 (see Fig. 23) located in the turret 73 on each side of the pockets. The pivot members 106 are also formed with angularly disposed legs 108 which extend into clearance recesses 109 in the turret.

The fingers 105 are retained under pressure of compression springs 111 which are interposed between the turret and the legs 108 of the fingers. A plate 112 is countersunk into the top of the turret on each side of a pocket 74 and the two plates for each pocket retain the fingers of that set in place. The spring held fingers thus hold the blank A in a horizontal position with the greater portion of the blank extending outwardly beyond the periphery of the turret.

Figure 25:
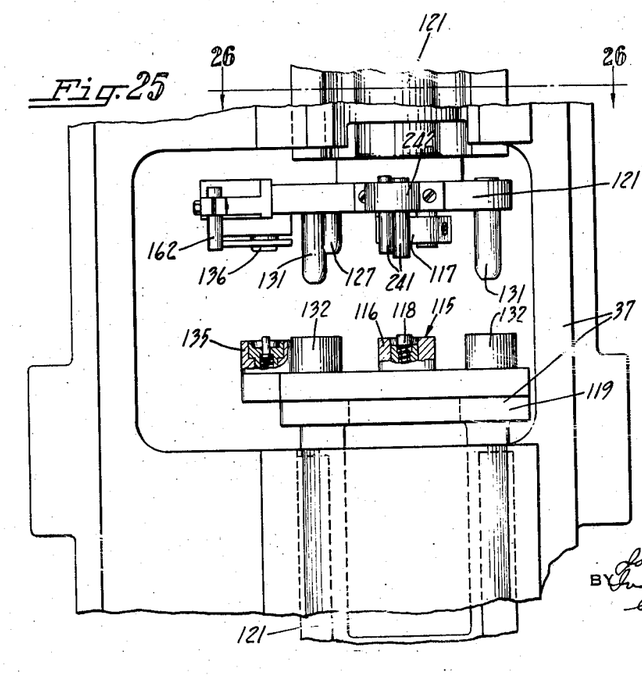
Fig. 25 is a front elevation of the closure element forming and trimming dies, with parts broken away.

While the blank A is held in this horizontal position in the turret 73 the latter is rotated through one step of advancement in a counterclockwise direction, as viewed in Fig. 10, and this shifts the held blank A into position over a forming die 115 (Figs. 10 and 25). It is this die that forms the depressed plug B (Fig. 3) in the blank.

The die 115 is of the usual drawing die construction which includes a stationary die shoe 116 and a movable punch 117. The die shoe is provided with a spring held knockout pin 118 and is supported on a bed plate 119 which is formed as a part of the main frame 37.

Figure 26:
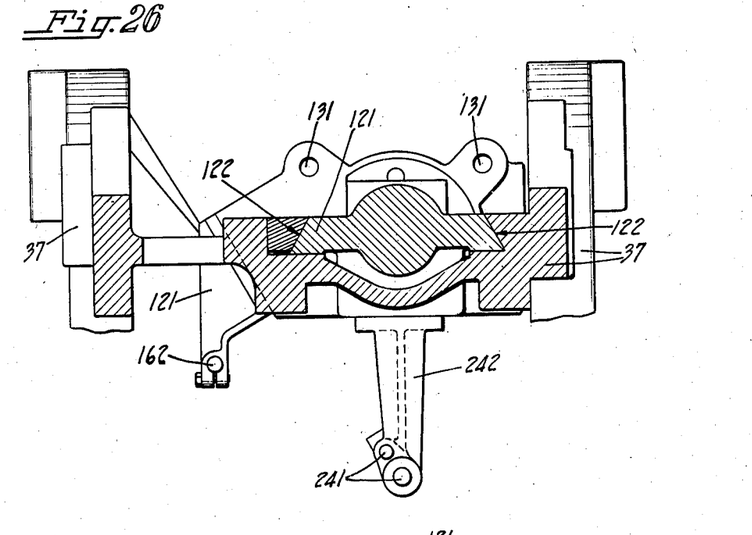
Fig. 26 is a horizontal sectional view taken substantially along the line 26—26 in Fig. 25.

The punch 117 is secured to a vertically movable slide member 121 (Fig. 26) which operates in a slideway 122 in the frame 37. The slide is actuated through a downward or operating stroke and thence through an upward or return stroke by a pitman 124 which is connected to a crank 125 on the auxiliary driving shaft 92. Hence the rotation of the auxiliary driving shaft also actuates the punch slide in time with the other moving parts of the machine.

Provision is made for locking the turret 73 against movement during this forming and subsequent operations. This is brought about by a locking pin 127 which is secured in the slide 121 and which moves down with the slide and engages into locking holes 128 (Fig. 10) in the turret. Pilot pins 131 also secured in the slide member 121 cooperate with guide holes formed in bosses 132 on the bed plate 119, to maintain the die and punch in alignment during the forming operation.

Upon the completion of the forming operation on the blank A, the turret 73 is again rotated through a stepped rotation and this brings the formed blank into position for trimming, the result of this being shown in Fig. 4. The trimming is effected by a lower trimming die 135 (Fig. 25) and a cooperating upper punch 136. The trimming elements are located adjacent the forming dies 115. The trimming die 135 is secured to the bed plate 119 while the punch 136 is fastened to the slide 121 and moves with it. Thus the trimming operation on a formed blank is effected on the same stroke of the slide that performs the forming operation on an unformed blank. It is this trimming that converts the blank A into the closure D.

After such a trimming operation the turret 73 is again rotated through the next step of rotation, at which time the closure element D is brought to rest at an assembling station where the closure element is assembled with an end member E, as shown in Fig. 6. The closure element is still held by the fingers 105.

At the assembling station a supply of the end members E are retained in a vertical stack in a magazine 141 (Figs. 8, 10 and 14) by guide bars 142 set into a slide cover 143. The slide cover extends out radially from the turret 73 and is secured to a slide bracket 144 bolted to the machine main frame 37. At the bottom the end members in the stack extend down into an opening 145 in the slide cover 143 and rest on top of a reciprocating slide bar 147 disposed in a slideway 148 in the slide bracket 144 (see also Fig. 16). The slide bar is formed with a stepped feed dog 149 (Fig. 14).

The end members E in the magazine 141 are fed from the bottom of the stack by the reciprocation of the slide bar 147. This reciprocation is brought about by a suitable lever device applied through a link 151 which connects the upper end of the cam lever 53 to a depending lug 152 on the slide bar. The lug extends down through a slot 154 in the bottom of the slide bracket. Hence by means of this connection with the lever 53 the slide bar is reciprocated through a forward or feed stroke and thence through a return stroke in time with the stepped rotation of the turret.

Upon a forward stroke of the slide bar 147, its dog 149 engages behind the lowermost end member E in the stack and slides it out from under the others and advances it toward the closure element D in the turret 73. The advancing end member slides along a radial support rail 156 which extends under the magazine 141 and which is disposed in an open clearance slot 157 formed in the inner end of the slide rail. The rail is part of an annular ring plate 158 which is secured to the machine table 36 and which is disposed under the turret.

The slide bar 147 pushing the end member E along the support rail 156, slides it into position under the suspended finger held closure element D and brings it to rest within a pocket 161 of the turret 73 (Figs. 10, 14, 22, 23). In the pocket 161 the inserted end member E rests on top of the ring plate 158 and the hole F in the end member is directly under the plug B of the closure element.

While the end member E and the closure element D are in this vertically aligned position within the now stationary turret 73 and before the turret begins to move through its next step of rotation, the closure element is pushed down out of its holding fingers 105. It is thus brought into engagement with the end member, the plug B of the closure element partially extending into the hole F of the end member, as shown in Fig. 14. This partial assembly is brought about by a pin 162 (see also Fig. 25) which is secured in the slide 121 and which moves down against the closure element when the slide descends through its operating stroke, as hereinbefore explained.

After such a partial assembling operation, the turret 73 rotates through another of its stepped movements and thus carries the partially assembled end member and closure element with it along the top of the ring plate 158. For this purpose the bottom of the turret is formed with depending annular tongues 164 (Figs. 14 and 18) which extend down into annular clearance grooves 165 in the ring plate and these tongues propel the end member along its path of travel.

As the end member E advances along the top of the ring plate 158, the plug section B of the closure element D is pressed down home into the hole F. This is brought about by a stationary cam plate 167 (Figs. 10, 11, 12 and 13) which is disposed above the path of travel of the closure element and against which the element engages as the turret 73 rotates. Figs. 11, 12 and 13 illustrate the different steps of seating the closure element as the turret rotates. The cam plate is hinged on a pintle 168 carried in a lug 169 formed on the machine table 36. A curved rail 171 secured to the table 36 supports the outer edge of the end member that overhangs the support rail 156.

As a result of this travel of the closure member D along the cam plate 167, it comes to rest at a stapling station. Here it is secured to the end member E by the wire staple G, as hereinbefore mentioned. The staples are formed from a strand 175 (Fig. 8) of wire taken from a spool 176 supported on an arm 177 mounted on a pivot pin 178 carried in a boss 179 of the machine main frame 37. The wire travels over a curved guide 181 and enters a stapling device 182 disposed over the path of travel of the closure element D. This device preferably is of the character disclosed in United States Patent 1,983,384, issued December 4, 1934, to Harry T. McClure on Wire stitching machine, and United States Patent 2,034,408, issued March 17, 1936, to the same inventor, on Machine for fastening covers to containers.

Such a stapling device is secured to a bracket 184 which is bolted to the machine frame. The device is operated by a bevel gear 185 mounted on a vertical shaft 186 of the device. The bevel gear 185 meshes with and is driven by a bevel gear 187 mounted on a horizontal shaft 188 journaled in bearings 189 in a bracket 191 bolted on top of the bracket 184. This shaft is rotated by an endless chain 192 which takes over a driven sprocket 193 on the shaft 188 and over a driving sprocket 194 (see Fig. 1) on the auxiliary drive shaft 92.

In the stapling device 182 the wire strand 175 is cut into lengths and bent into U-shape to provide the staples G. The legs of a staple thus formed are driven through the closure element D and through the end member E while they are at the stapling station. The ends of the staples then are bent inwardly on the under side of the member. This secures the element and the member together to form the end closure unit H.

Insertion of the staple is effected by a hammer 201 (Fig. 22) which is a part of the stapling device. During the insertion of the staple, the end member E is supported on a cylindrical anvil 202. The anvil is recessed as at 203 to provide a clearance space for the depressed plug B of the closure element. The top face of the anvil is formed with a plurality of sets of wire bending grooves 204 (see Fig. 23) a single set being used at one time for bending the ends of the staple back up against the bottom of the end member E.

When one set of the wire bending grooves 204 become worn out, the anvil may be rotated partially to bring a new set into place. Thus the anvil may be made to last over a longer period. For these purposes the anvil is mounted in a vertical sleeve 206 carried in a bearing 207 formed in a web 208 of the main frame 37 just below the table 36. The anvil is held in place by a half round clamp plate 209 which extends into an annular groove 211 in the periphery of the anvil. The plate is bolted to a lug 212 on the sleeve.

Figures 22, 23, 24:
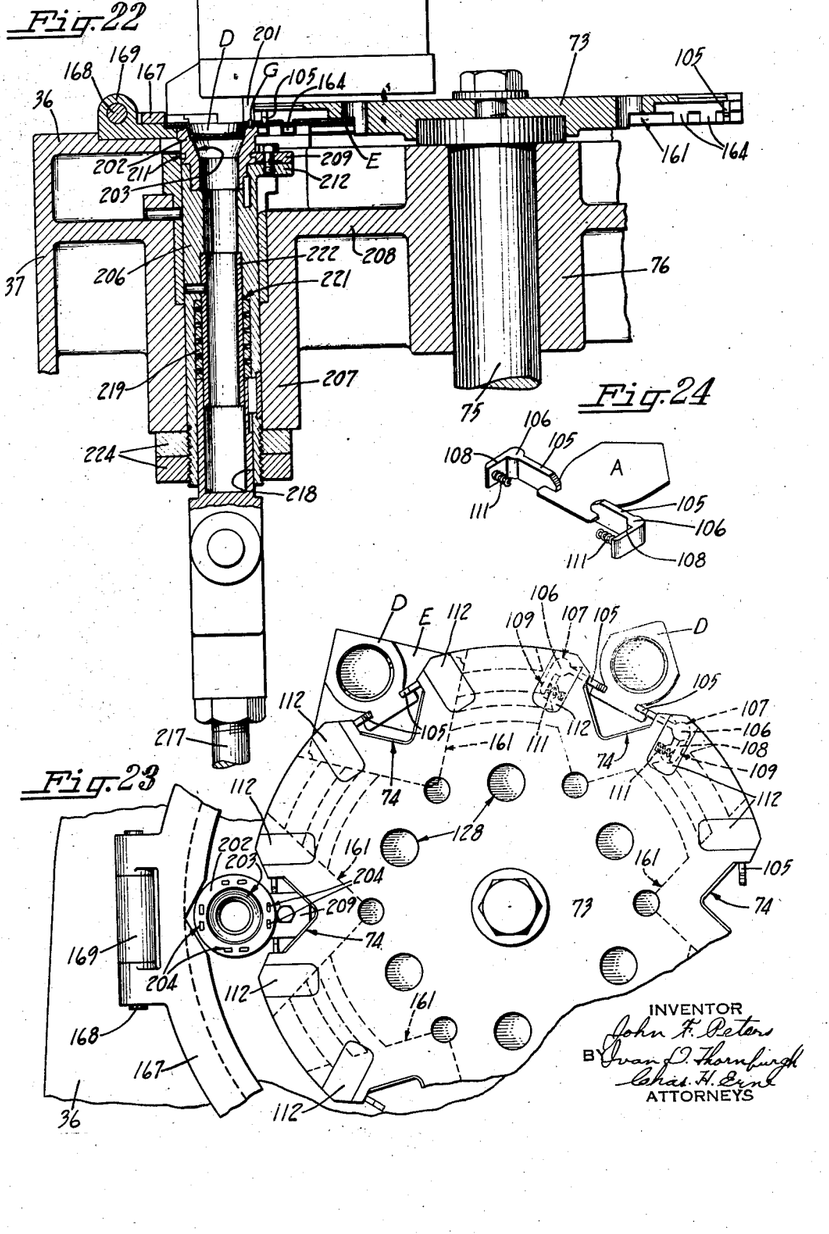
Fig. 22 is an enlarged section taken substantially along the line 22—22 in Fig. 10, with parts broken away.
Fig. 23 is a top plan view of the parts shown in Fig. 22, with parts broken away.
Fig. 24 is an enlarged perspective view of a closure element blank and its holding fingers.

The sleeve 206 is moved vertically to bring the anvil 202 into place around the plug B of the closure element at the beginning of a stapling operation and to withdraw the anvil from the plug at the end of the operation. This is done by a cam 215 (Fig. 8) which is mounted on the main drive shaft 59. The cam actuates a cam lever 216 which is connected by a vertical link 217 to the lower end of a hollow plunger 218 (Fig. 22). The plunger extends up into the sleeve 206 and presses against a compression spring 219 located within the sleeve. The spring abuts against a shoulder 221 in the sleeve and a guide tube 222 secured within the sleeve and extending down through the spring, retains the latter in place.

Thus the link 217 and its plunger 218 are shifted up and down in time with the other moving parts of the machine and the anvil is moved into and out of place at the proper time. The compression spring 219 provides a yieldable backing for the anvil while a pair of locknuts 224 on the lower end of the sleeve provide for adjustment of the anvil relative to the end member E in the turret 73. These locknuts engage against the bottom of the bearing 207.

The stapling together of the parts which constitute the end closure unit H completes the operations thereon and a part so made is discharged from the machine and is arranged in a horizontal stack from which they may be removed manually as desired. The discharge of the closure unit H is effected upon the next stepped rotation of the turret 73. This rotation of the turret brings the end structure into the discharge station where it comes to rest over an intermittently rotated transfer disc 231 (Figs. 10 and 19) having four square pockets 232. The disc is secured to the upper end of a vertical shaft 233 journaled in bearings 234 (see also Fig. 8) formed in the machine main frame 37. The shaft is rotated by a gear 235 which is carried on the lower end thereof and which meshes with a driving gear 236 mounted on the turret shaft 75.

Hence the disc shaft 233 and the disc 231 carried thereon are rotated in time with the turret shaft 75 and its turret 73. Thus when the turret brings a closure unit H into the discharge station, the transfer disc 231 also brings an empty pocket 232 into place under the unit to receive it. The unit is transferred from the turret pocket 161 to the disc pocket 231 by a pair of pins 241 (Figs. 9, 19, 25, 26) which are secured to a long arm 242 bolted to the slide 121. The pins move down with the slide on its operating stroke and thus push the closure unit down into the disc pocket.

An end closure unit H received in a disc pocket 232 is carried horizontally along a curved path of travel through an idle station and thence into a stacking station. During this travel of the end unit it slides on a table insert 245 disposed in the table 36 and located under the transfer disc. The insert is formed with a wide groove 246 to accommodate the plug B on the closure element D. The table insert is further formed with an adjacent narrow clearance groove 247 for a tongue 248 that depends from the bottom of the disc and serves to propel the closure unit across the table insert.

At the stacking station the transfer disc 231 brings a closure unit H into position over a vertical movable stacking or lifter pad 251 (Figs. 19, 20, 21) disposed in an opening 252 in the table insert and in a recess 253 in the table 36. The pad is formed with clearance grooves 254, 255 which correspond to the grooves 246, 248 in the table insert.

The lifter pad 251 is formed on the upper end of a stem 257 which is carried in a slide bearing 258 in the table 36. The pad is raised and lowered in time with the rotation of the transfer disc 231, by a link 261 having a plunger head 262 disposed in a bore 263 in the lifter pad stem. A locknut 264 threaded into the lower end of the stem prevents displacement of the plunger head from its bore, while a compression spring 265 interposed between the stem and the plunger provides a flexible and yieldable connection between them.

The lower end of the link 261 is connected to a cam arm 267 (see Fig. 10) which is enclosed in a housing 268 (see also Fig. 9) bolted to the table 36. The arm extends through an opening in the housing and is mounted on a pivot pin 269 carried in lugs 271 formed on the housing. The arm also carries a cam roll 275 which operates in a cam groove formed in a face cam 276 mounted on a cam shaft 277 which is journaled in bearings 278 formed in the ends of the housing. The shaft is rotated in time with the other moving parts of the machine by a bevel gear 279 which meshes with a bevel gear 281 mounted on the vertical drive shaft 98.

Thus at the proper time the cam 276 rocks the cam arm 267 and raises the lifter pad 251. The lifter pad engages and lifts a completed closure unit H from its pocket 232 in the disc 231 and pushes it up through an opening 283 in a magazine bracket 284 which is secured to the top of the table 36. The closure unit is elevated to a position above a plurality of spring held catch fingers 285 (Fig. 21) disposed in slots 286 distributed around the opening in the magazine bracket. Hence when the lifter pad moves down through a return stroke it leaves the closure unit H in the magazine opening 283 and supported on the catch fingers 285.

A long spring held finger 288 (Fig. 20) presses down against the closure unit in the magazine opening 283 and thus confines the unit against displacement. This finger is mounted on a pivot pin 289 carried in the magazine bracket 284. A spring 291 coiled around the pivot pin and having one end against the finger and the other against the bracket, maintains the finger under constant pressure.

Figures 19, 20, 21:
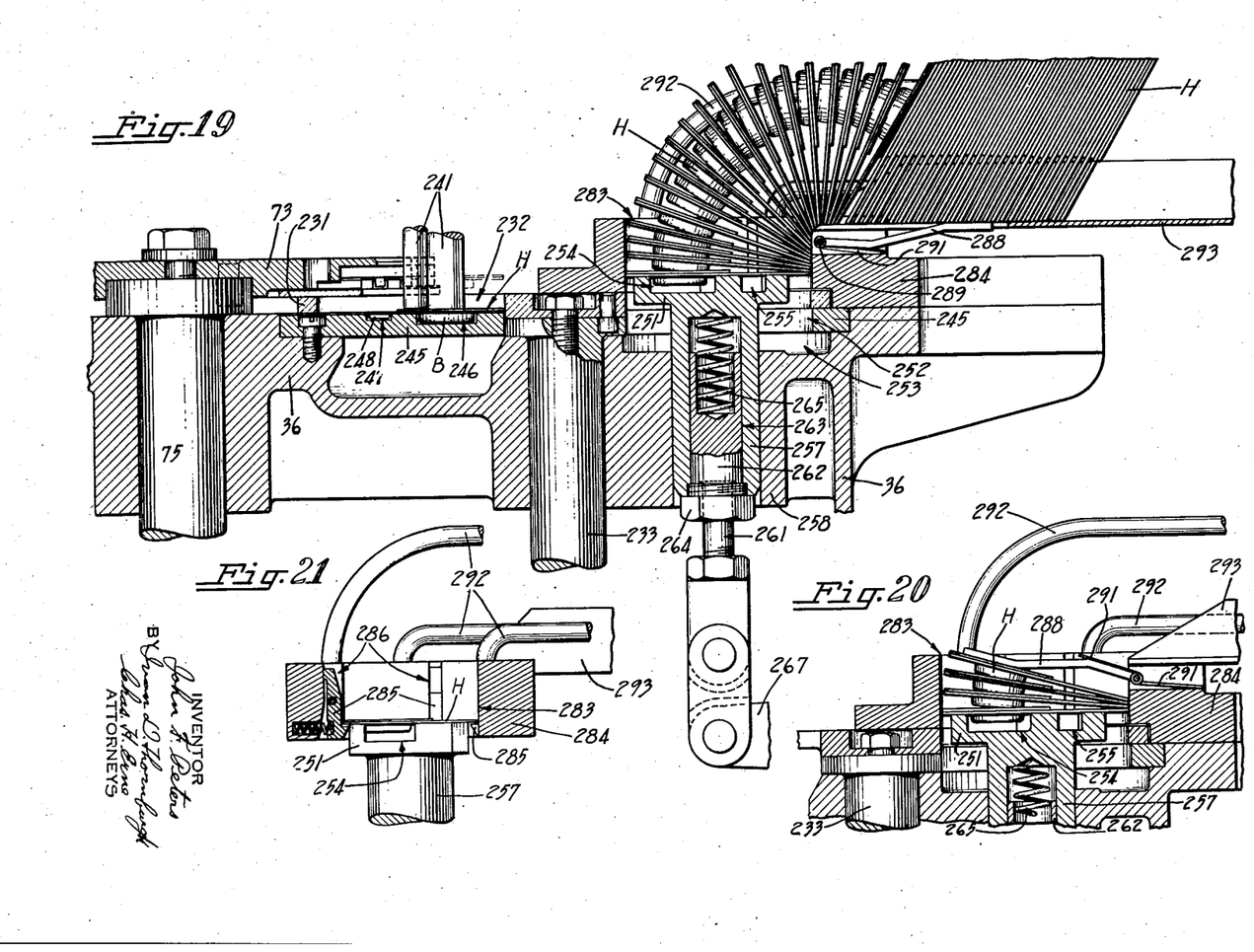
Fig. 19 is an enlarged sectional view taken substantially along the line 19—19 in Fig. 10, with parts broken away.
Figs. 20 and 21 are sectional details of parts shown in Fig. 19 with the movable parts in different positions.

As additional end closure units H are pushed up through the magazine opening 283, they force up the spring held finger 288. In so doing the closure units build up in a curved stack, as shown in Figs. 19 and 20. Fig. 20 shows the start of such a stacking operation, while Fig. 19 illustrates a full stack of units. Curved guide rails 292 each having one end secured in the magazine bracket 284 adjacent the opening 293, guide the building up of such a stack of end closure units. This results as the closure units pass through their curved path of travel and at the top of the curved portion the path of travel levels off into a horizontal position to provide a stack support formed by a V-shaped trough 293 disposed adjacent the lower guide rails 292.

When such a stack of end closure units is once started it readily continues to build up and maintain itself. From time to time the stacked end closure units may be removed manually from the trough for subsequent operations.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for making fibre container parts, the combination of a rotatable turret, means for feeding a blank into said turret, die mechanism disposed adjacent said turret for forming said blank into a closure element having a drawn depressed plug section while in said turret, devices for advancing a preformed apertured cooperating end member into position adjacent said closure element, means for bringing said parts into registering position, devices disposed in cooperative relation to said turret for inserting said plug section of the closure element into the aperture of said end member, and instrumentalities also disposed in cooperative relation to said turret for premanently securing the assembled parts together to provide a composite end closure unit.

2. In a machine for making fibre container parts, the combination of a rotatable turret, means for feeding a blank into said turret, forming die mechanism located adjacent said turret for forming said blank into a closure element having a drawn depressed plug section while in said turret, trimming die mechanism also located adjacent said turret for trimming said formed closure element outwardly of said plug section while in said turret, devices for advancing a preformed cooperating end member having an aperture therein into registering position adjacent said closure element, means disposed in cooperative relation to said turret for inserting said drawn plug section into the aperture of said end member, and instrumentalities also cooperating with said turret for securing the parts thus assembled together to provide a composite end closure unit.

3. In a machine for making fibre closure units, the combination of a rotatable turret having a pocket, a pair of yieldable fingers disposed above said pocket in said turret and movable therewith, means for feeding a closure element blank into the grip of said fingers, die mechanism for forming said blank into a closure element while it is held by said fingers, feeding devices for introducing a preformed can end member into the pocket of said turret in spaced relation to said formed closure element, means for bringing said closure element and said end member together, and instrumentalities for securing the parts thus assembled to provide an end closure unit.

4. In a machine for making fibre closure units, the combination of a rotatable turret having a pocket, means for feeding a blank for a closure element into said turret, devices for holding the blank above the turret pocket, die mechanism for forming a depressed plug section in said blank while in said turret, feeding devices for introducing a preformed can end member having a dispensing hole therein into the pocket of said turret, and a stationary cam track disposed adjacent the path of travel of the closure element for bringing it into engagement with the end member and for forcing its plug section into the dispensing opening of the end member to produce an end closure unit for use in a container.

5. In a machine for making fibre closure units, the combination of an intermittently rotatable turret having a plurality of pockets disposed around its circumference, a magazine located adjacent said turret for holding closure element blanks, a runway extended from said magazine to said turret and overhanging the turret, means for feeding the blanks individually along said runway from the magazine to a position over the pockets of said turret and in time with the rotation of the turret, devices for transferring the positioned blanks from the runway to the turret, holding devices on said turret for receiving and holding a blank, mechanism located adjacent said turret for forming a said blank into a closure element while in the turret, means for assembling said formed closure element with an end member, and instrumentalities for securing said closure element and the end member together to produce an end closure unit.

6. In a machine for making fibre container parts, the combination of a rotatable turret, means for feeding a blank for a closure element into said turret, mechanism for forming said blank into a closure element while it is in said turret, means for bringing an end member into assembled position with said closure element while in said turret, instrumentalities for securing the end member and the closure element together to produce an end closure unit, a discharge disc disposed adjacent said turret, a transfer device for transferring the end closure unit from the turret to the disc, and means located adjacent said disc for receiving and stacking said end closure units.

7. In a machine for making fibre container parts, the combination of a rotatable turret, means for feeding a blank for a closure element into said turret, mechanism for forming said blank into a closure element while it is in said turret, means for bringing an end member into assembled position with said closure element while in said turret, instrumentalities for securing the end member and the closure element together to produce an end closure unit, a discharge disc having spaced pockets overlapping said turret, a plunger for transferring an end closure unit from a pocket of the turret to a pocket of the disc, a lifter pad for discharging an end closure unit vertically from a disc pocket, spring held catches for receiving and holding discharge end closure units above said disc, and curved guide rails for guiding and for retaining the end closure units into a horizontal stack.

8. In a machine for making fibre container parts, the combination of a rotatable turret, means for feeding a blank for a closure element into said turret, mechanism for forming said blank into a closure element while it is in said turret, means for bringing an end member into assembled position with said closure element while in said turret, instrumentalities for securing the end member and the closure element together to produce an end closure unit, a discharge disc having spaced pockets overlapping said turret, a plunger for transferring a closure unit from a pocket of the turret to a pocket of the disc, a lifter pad for discharging a closure unit vertically from a disc pocket, spring held catches for receiving and holding discharged units above said disc, curved guide rails for guiding and for retaining the units into a vertical and curved stack which merges into a horizontal stack, and a spring held pivoted finger for holding the units while they turn the corner of the stack.

9. In a machine for making fibre container parts, the combination of a rotatable turret, means for feeding a blank for a closure element into said turret, mechanism for forming said blank itno a closure element while it is in said turret, said mechanism including a die element for forming a drawn plug section in said closure element, means for bringing an end member having a preformed aperture therein into registering position with said closure element while in said turret, devices disposed in cooperative relation to said turret for inserting the plug section of said closure element into the aperture of said end member, a movable stitching instrumentality for driving a staple through the end member and closure element thus assembled for securing the same together to form a composite end closure unit, a spring pressed anvil cooperating with said stitching instrumentality for bending over the ends of the staple, said anvil being rotatable relative to said instrumentality for bringing different selective portions of the anvil into cooperative relation thereto, and means for reciprocating said anvil toward and away from said closure unit and said stitching instrumentality in time with the stitching movement of the latter.

10. In a machine for making fibre container parts, the combination of a rotatable turret having a pocket, means for feeding a blank for a closure element into said turret adjacent said pocket, mechanism for forming said blank into a closure element while it is in said turret, feeding devices for introducing a preformed can end member into the pocket of said turret, a stationary table on which said end member is supported while in said turret pocket, tongues formed on said turret and extending into clearance grooves in said table for propelling the end member when the turret rotates, means for bringing said end member and said closure element together in said pocket, and instrumentalities for securing the end member and the closure element together to produce an end closure unit.

JOHN F. PETERS.